United States Patent
Yamashita et al.

(10) Patent No.: US 8,443,624 B2
(45) Date of Patent: May 21, 2013

(54) NON-AZEOTROPIC REFRIGERANT MIXTURE AND REFRIGERATION CYCLE APPARATUS

(75) Inventors: Tetsuya Yamashita, Tokyo (JP); Akihiro Nishida, Tokyo (JP); Hirokazu Taniguchi, Tokyo (JP); Takashi Okazaki, Tokyo (JP); Yoshihiro Sumida, Tokyo (JP); Masato Yosomiya, Tokyo (JP); Kazuhiko Shiraishi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 396 days.

(21) Appl. No.: 12/997,117

(22) PCT Filed: Jun. 12, 2009

(86) PCT No.: PCT/JP2009/060774
§ 371 (c)(1),
(2), (4) Date: Dec. 9, 2010

(87) PCT Pub. No.: WO2009/154149
PCT Pub. Date: Dec. 23, 2009

(65) Prior Publication Data
US 2011/0079042 A1    Apr. 7, 2011

(30) Foreign Application Priority Data
Jun. 16, 2008   (JP) ................................ 2008-156805

(51) Int. Cl.
*F25B 1/00* (2006.01)
(52) U.S. Cl.
USPC ................................. 62/498; 62/510; 62/512

(58) Field of Classification Search
USPC ... 62/498, 509, 510, 512, 129, 228.3; 252/67, 252/71
See application file for complete search history.

(56) References Cited

U.S. PATENT DOCUMENTS

| 5,987,907 A | 11/1999 | Morimoto et al. |
| 6,032,473 A | 3/2000 | Morimoto et al. |

(Continued)

FOREIGN PATENT DOCUMENTS

| JP | 61-6546 A | 1/1986 |
| JP | 7-48563 A | 2/1995 |

(Continued)

OTHER PUBLICATIONS

Office Action (Notification of Reason for Refusal) dated Mar. 22, 2012, issued in corresponding Chinese Patent Application No. 200980122508.6 and a partial English Translation thereof. (5 pages).

(Continued)

*Primary Examiner* — Mohammad M Ali
(74) *Attorney, Agent, or Firm* — Buchanan Ingersoll & Rooney PC

(57) ABSTRACT

Disclosed is a non-azeotropic refrigerant mixture containing tetrafluoropropane as a high-boiling refrigerant and a refrigeration cycle apparatus in which a non-azeotropic refrigerant mixture containing tetrafluoropropane as a high-boiling refrigerant circulates through a refrigeration cycle so as to avoid occurrence of negative pressure in a low-pressure circuit.

The non-azeotropic refrigerant mixture is characterized in that a mixing ratio of a high-boiling refrigerant and a low-boiling refrigerant is determined so that a saturated vapor line where pressure is 0.00 MPa is not higher than −45° C. in a low-pressure circuit formed between the decompressor to the compressor.

11 Claims, 4 Drawing Sheets

U.S. PATENT DOCUMENTS

| | | | |
|---|---|---|---|
| 6,854,285 B2 * | 2/2005 | Jessen | 62/225 |
| 6,881,354 B2 * | 4/2005 | Arman et al. | 252/67 |
| 7,309,459 B2 * | 12/2007 | Minor | 264/53 |
| 7,413,676 B2 * | 8/2008 | Nappa et al. | 252/68 |
| 7,493,775 B2 * | 2/2009 | Shimamoto et al. | 62/199 |
| 2004/0068999 A1 * | 4/2004 | Jessen | 62/222 |
| 2004/0089839 A1 | 5/2004 | Thomas et al. | |
| 2004/0119047 A1 | 6/2004 | Singh et al. | |
| 2004/0127383 A1 | 7/2004 | Pham et al. | |
| 2004/0256594 A1 | 12/2004 | Singh et al. | |
| 2005/0090698 A1 | 4/2005 | Merkel et al. | |
| 2007/0007488 A1 | 1/2007 | Singh et al. | |
| 2007/0010592 A1 | 1/2007 | Bowman et al. | |
| 2007/0069175 A1 | 3/2007 | Thomas et al. | |
| 2007/0129579 A1 | 6/2007 | Wang et al. | |
| 2007/0238908 A1 | 10/2007 | Merkel et al. | |
| 2007/0290177 A1 | 12/2007 | Singh et al. | |
| 2008/0098755 A1 | 5/2008 | Singh et al. | |
| 2008/0099190 A1 | 5/2008 | Singh et al. | |
| 2008/0121837 A1 | 5/2008 | Singh et al. | |
| 2008/0125505 A1 | 5/2008 | Bowman et al. | |
| 2008/0125506 A1 | 5/2008 | Bowman et al. | |
| 2008/0135800 A1 | 6/2008 | Bowman et al. | |
| 2008/0166305 A1 | 7/2008 | Singh et al. | |
| 2008/0171652 A1 | 7/2008 | Singh et al. | |
| 2008/0194888 A1 | 8/2008 | Merkel et al. | |
| 2008/0207788 A1 | 8/2008 | Bowman et al. | |
| 2008/0292564 A1 | 11/2008 | Singh et al. | |

FOREIGN PATENT DOCUMENTS

| | | |
|---|---|---|
| JP | 7-269972 A | 10/1995 |
| JP | 8-152208 A | 6/1996 |
| JP | 2002-228307 A | 8/2002 |
| JP | 2006-512426 A | 4/2006 |
| JP | 2007-535611 A | 12/2007 |

OTHER PUBLICATIONS

Office Action issued on May 22, 2012 by the Japanese Patent Office in corresponding Japanese Patent Application No. 2010-517894, and an English translation thereof.

International Search Report (PCT/ISA/210) issued on Sep. 1, 2009, by Japanese Patent Office as the International Searching Authority for International Application No. PCT/JP2009/060774.

Office Action (Notification of the Second Office Action) dated Nov. 2, 2012, issued in corresponding Chinese Patent Application No. 200980122508.6, and an English Translation thereof. (8 pages).

* cited by examiner

| | A | | | | B | | |
|---|---|---|---|---|---|---|---|
| | R32 | R125 | TETRAFLUOROPROPANE | | R32 | R125 | TETRAFLUOROPROPANE |
| A1 | 0.0% | 81.0% | 19.0% | B1 | 0.0% | 92.2% | 7.8% |
| A2 | 10.0% | 60.0% | 30.0% | B2 | 15.1% | 72.2% | 12.7% |
| A3 | 20.0% | 40.0% | 40.0% | B3 | 30.9% | 51.6% | 17.5% |
| A4 | 27.3% | 27.3% | 45.4% | B4 | 42.6% | 37.1% | 20.4% |
| A5 | 40.0% | 6.0% | 54.0% | B5 | 64.9% | 9.1% | 26.0% |
| A6 | 44.0% | 0.0% | 56.0% | B6 | 72.4% | 0.0% | 27.6% |

NON-AZEOTROPIC REFRIGERANT MIXTURE AND REFRIGERATION CYCLE APPARATUS

TECHNICAL FIELD

The present invention relates to a non-azeotropic refrigerant mixture which circulates in a refrigeration cycle and to a refrigeration cycle apparatus using the refrigeration cycle. More particularly, the invention relates to a non-azeotropic refrigerant mixture and a refrigeration cycle apparatus which operate highly reliably and efficiently.

BACKGROUND ART

A refrigeration cycle apparatus adapted to circulate a non-azeotropic refrigerant mixture through a refrigeration cycle has been proposed (see, for example, Patent Literature 1).

Regarding refrigerants used in a refrigeration cycle apparatus, HFC-based refrigerants, such as hydrofluorocarbon (HFC)134a, R404A, R410A and R407c, which mainly consists of carbon, hydrogen and fluorine have been used widely in place of chlorine-containing refrigerants, such as chlorofluorocarbon (CFC)-12 and hydrochlorofluorocarbon (HCFC) 22 from the viewpoint of ozonosphere protection. However, use of the HFC-based refrigerants having greater global warming potential has also been avoided in response to a recent growing concern over the global environment problem. Replacement of the HFC-based refrigerants with refrigerants having smaller global warming potential (i.e., low-GWP refrigerants) has been investigated. Note that the global warming potential is a value representing a degree of greenhouse effect with the greenhouse effect of carbon dioxide being a criterion.

A strong candidate of such alternative refrigerant is hydrofluoroolefin (also referred to as fluoroalkene) (see, for example, Patent Literature 2). Hydrofluoroolefin has lower chemical stability as compared with that of the HFC-based refrigerant and thus smaller global warming potential. R410A, a HFC-based refrigerant, has the global warming potential that is about 2000 times greater than that of carbon dioxide. As compared with R410A, hydrofluoroolefin has the global warming potential that is about four times greater than that of carbon dioxide. Further, pressure level necessary for hydrofluoroolefin is advantageously the same as those of the related art HFC-based refrigerants.

CITATION LIST

Patent Literature

PTL 1: Japanese Unexamined Patent Application Publication No. 61-6546 (page 2, FIG. 2)
PTL 2: Japanese Unexamined Patent Application. Publication No. 2006-512426 (page 11)

SUMMARY OF INVENTION

Technical Problem

In widely used refrigeration cycle apparatuses dedicated for use at low temperatures, an evaporation temperature of the refrigerant is typically as low as about −45° C. Thus, when tetrafluoropropane, which is one of hydrofluoroolefins and is a high-boiling refrigerant of −29° C., is used as a single working fluid, a circuit of a low-pressure side, i.e., a circuit from a decompressor to a compressor, (hereinafter, referred to as a low-pressure circuit) of the refrigeration cycle apparatus has a negative pressure. As a reference, a boiling point of R404A is −46.6° C. and a boiling point of R410A is −51.6° C. Apart from a refrigeration cycle apparatus that those dedicated for use at low temperatures, when applied to the heating operation in a low-temperature environment (for example, −10° C.), an evaporation temperature may be decreased to as low as about −45° C. In this case, the low-pressure circuit also becomes a negative pressure.

As described above, there is a problem that, when a tetrafluoropropane-containing non-azeotropic refrigerant mixture is employed, a low-pressure circuit of the refrigeration cycle apparatus becomes a negative pressure depending on the composition ratio of the refrigerant. When the low-pressure circuit of the refrigeration cycle apparatus is under negative pressure, air and moisture may be sucked into the low-pressure circuit in the event of troubles such as pipe cracks and loosened flare and flange connection. As described above, tetrafluoropropane is said to be a low GWP refrigerant (GWP is about 4). It is known that chemical stability is low and it is easily decomposed by air or moisture.

Thus, tetrafluoropropane may easily be decomposed by air or moisture sucked into the refrigeration cycle. The decomposed tetrafluoropropane no more functions as a refrigerant. In particular, chemical decomposition of tetrafluoropropane yields different foreign substances or impurity gas (hereinafter, referred to as sludge). As the sludge accumulates in the refrigeration cycle, the circuit may be clogged or sliding parts in the compressor may be damaged. As a result, the operation of the refrigeration cycle apparatus may be interfered.

When such interference occurs in the refrigeration cycle apparatus, it is necessary to remove the moisture and the sludge from the refrigeration cycle. In particular, it is necessary to restore the refrigeration cycle apparatus by washing out the inside of the refrigeration cycle or replacing all the components of the refrigeration cycle. Since such restoration of the refrigeration cycle apparatus is not completed with a simple maintenance work, there is a problem that the restoration requires greater effort, cost and time.

Non-azeotropic refrigerant mixtures containing no tetrafluoropropane have a stable chemical property and thus operate efficiently without causing variation in the refrigerant composition thereof while circulating through the refrigeration cycle under constant operating conditions and load conditions of the refrigeration cycle apparatus. In the event, however, that the operating conditions and the load conditions of the refrigeration cycle apparatus vary, especially when an amount of the refrigerant stored in the low-pressure vapor/liquid separator varies, then the refrigerant composition of the non-azeotropic refrigerant mixture circulating through the refrigeration cycle, also varies. It is therefore necessary to control the refrigeration cycle according to the varied refrigerant composition. It is necessary to adjust a flow rate of the refrigerant by controlling a rotational speed of a compressor or controlling a ratio of opening of an expansion valve.

Related art refrigeration cycle apparatuses, however, are not provided with any devices to detect the composition of the refrigerant circulating through the refrigeration cycle. It is therefore not possible to continue the optimal operation in accordance with the refrigerant composition. At worst, the composition of the refrigerant circulating through the refrigeration cycle may vary, whereby a composition ratio of a high-boiling refrigerant in a low-pressure circuit becomes high and thus the low-pressure circuit is made to be under negative pressure. In the event that the composition of the refrigerant circulating through the refrigeration cycle varies due to leakage of the refrigerant during operation of the refrigeration cycle or malfunctions at the time of filling the refrigeration cycle with the refrigerant, such abnormality in refrigerant composition will not be detected. Resultantly, safety and reliability of the refrigeration cycle apparatus may be impaired. If a refrigerant containing easily-decomposing tetrafluoropropane is employed in such a refrigeration cycle apparatus, necessity for detection of the refrigerant composition becomes even greater.

The invention has been made to solve the problems described above and an object thereof is to provide a non-azeotropic refrigerant mixture containing tetrafluoropropane as a high-boiling refrigerant and a refrigeration cycle apparatus in which a non-azeotropic refrigerant mixture containing tetrafluoropropane as a high-boiling refrigerant circulates through a refrigeration cycle so as to avoid occurrence of negative pressure in a low-pressure circuit.

Solution to Problem

A non-azeotropic refrigerant mixture which circulates through a refrigeration cycle configured at least by a compressor, a condenser, a decompressor and an evaporator, the non-azeotropic refrigerant mixture including tetrafluoropropane as a high-boiling refrigerant and a or some low-boiling refrigerant(s) mixed together at a predetermined mixing ratio, characterized in that the mixing ratio of the high-boiling refrigerant and the low-boiling refrigerant is determined so that a saturated vapor line where a gauge pressure that suppresses refrigerant decomposition due to incorporation of the fluid is 0.00 MPa is not higher than −45° C. in a low-pressure circuit formed between the decompressor and the compressor.

A refrigeration cycle apparatus in which a non-azeotropic refrigerant mixture circulates through a refrigeration cycle configured by a compressor, a condenser, a first decompressor, a vapor/liquid separator, a second decompressor and an evaporator which are connected sequentially, the non-azeotropic refrigerant mixture including a high-boiling refrigerant and a or some low-boiling refrigerant(s) mixed at a predetermined mixing ratio, in which the apparatus is characterized by including a controller for adjusting the pressure in the vapor/liquid separator by controlling opening of the first decompressor and the second decompressor, and determining the mixing ratio of the high-boiling refrigerant and the low-boiling refrigerant of the non-azeotropic refrigerant mixture so that a saturated vapor line where a gauge pressure that suppresses refrigerant decomposition due to incorporation of the fluid is 0.00 MPa is not to be higher than −45° C. in a low-pressure circuit formed between the second decompressor and the compressor.

A refrigeration cycle apparatus in which a non-azeotropic refrigerant mixture circulates through a refrigeration cycle configured by a compressor, a condenser, a liquid receiver, a decompressor, an evaporator and a low-pressure vapor/liquid separator which are connected sequentially, the non-azeotropic refrigerant mixture including a high-boiling refrigerant and a or some low-boiling refrigerant(s) mixed together at a predetermined mixing ratio, in which the apparatus is characterized by including a controller for adjusting a composition ratio of the non-azeotropic refrigerant mixture stored in the low-pressure vapor/liquid separator and the composition ratio of the non-azeotropic refrigerant mixture made to flow out of the low-pressure vapor/liquid separator by controlling opening of the decompressor, and determining the mixing ratio of the high-boiling refrigerant and the low-boiling refrigerant of the non-azeotropic refrigerant mixture so that a saturated vapor line of the non-azeotropic refrigerant mixture where a gauge pressure that suppresses refrigerant decomposition due to incorporation of the fluid is 0.00 MPa is not to be higher than −45° C. in a low-pressure circuit formed between the decompressor and the compressor.

In the non-azeotropic refrigerant mixture, since the mixing ratio of the high-boiling refrigerant and the low-boiling refrigerant is determined so that a saturated vapor line where a gauge pressure that suppresses refrigerant decomposition due to incorporation of the fluid is 0.00 MPa is not higher than −45° C. in a low-pressure circuit formed between the decompressor and the compressor, occurrence of negative pressure in the low-pressure circuit can be avoided.

In the refrigeration cycle apparatus according to the invention, since a non-azeotropic refrigerant mixture consisting of a high-boiling refrigerant and a low-boiling refrigerant mixed together is employed as a working fluid and a saturated vapor line of the non-azeotropic refrigerant mixture where pressure is 0.00 MPa (i.e., gage pressure is not higher than −45° C. in a low-pressure circuit of the refrigeration cycle apparatus (i.e., a circuit formed between a second decompressor and a compressor), occurrence of negative pressure in the low-pressure circuit can be avoided, thereby assuring a highly reliable operation.

In the refrigeration cycle apparatus according to the invention, since a non-azeotropic refrigerant mixture consisting of a high-boiling refrigerant and a low-boiling refrigerant mixed together is employed as a working fluid and a saturated vapor line of the non-azeotropic refrigerant mixture where pressure is 0.00 MPa (i.e., gage pressure) is determined to be not higher than −45° C. in a low-pressure circuit of the refrigeration cycle apparatus (i.e., a circuit formed between a decompressor and a compressor), occurrence of negative pressure in the low-pressure circuit can be avoided, thereby assuring a highly reliable operation.

DESCRIPTION OF EMBODIMENTS

Hereinafter, Embodiments of the invention will be described with reference to the drawings.

Embodiment 1

Figures 1, 2:
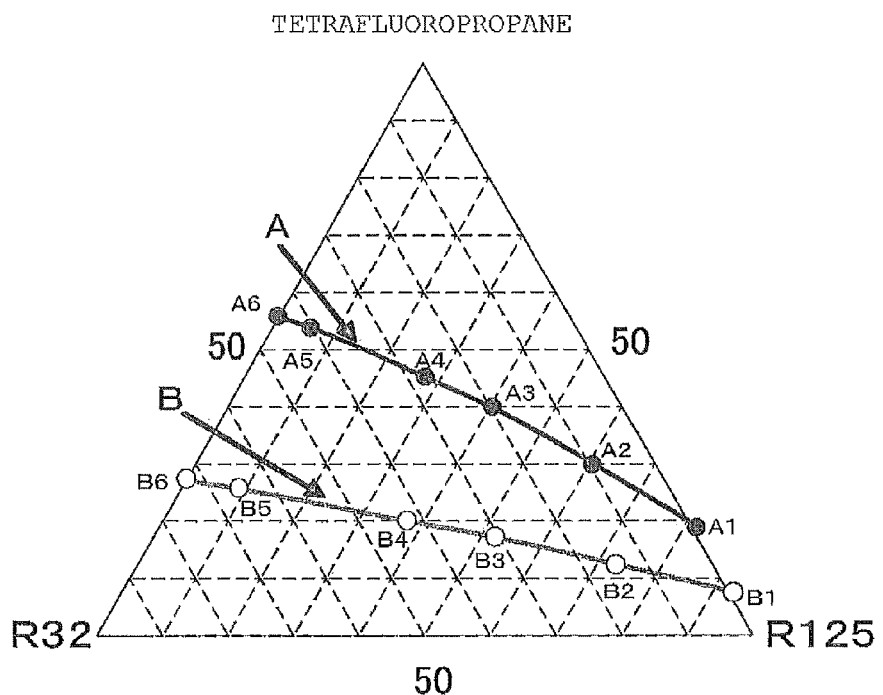
FIG. 1 is a triangular coordinate representing an equilibrium state of a non-azeotropic refrigerant mixture as a working fluid for a refrigeration cycle apparatus at a constant temperature and under constant pressure.
FIG. 2 is a table illustrating a mixing ratio of the working fluid in FIG. 1.

FIG. 1 is a triangular coordinate representing an equilibrium state of a non-azeotropic refrigerant mixture as a working fluid for a refrigeration cycle apparatus at a constant temperature and under a constant pressure. FIG. 2 is a table illustrating a mixing ratio of the working fluid in FIG. 1. With reference to FIGS. 1 and 2, an equilibrium state of a working fluid at a constant temperature and under a constant pressure will be described. The working fluid consists of a mixture of three chlorofluorocarbons, namely, difluoromethane (R32) and pentafluoroethane (R125) as low-boiling refrigerants, and tetrafluoropropane, which is one of hydrofluoroolefins, as a high-boiling refrigerant.

In FIG. 1, each single substance, i.e., tetrafluoropropane, R32 or R125 is disposed at each vertex of the triangle. Tetrafluoropropane, R32 and R125 are disposed in this order from the top vertex in a counterclockwise direction. In particular, tetrafluoropropane is disposed at the top vertex on the paper, R32 is disposed at the left hand vertex on the paper and R125 is disposed at the right hand vertex on the paper. A composition ratio (i.e., a mass ratio) of each component in a certain point on the coordinate system is represented by a ratio of the distance between the point of interest and each side of the triangle. The distance between the point of interest and each side of the triangle corresponds to the composition ratio of the substance illustrated at each vertex of the triangular coordinate facing with the side.

A line A in FIG. 1 is a vapor/liquid equilibrium curve representing a saturated liquid line where the temperature is −45° C. and the pressure (i.e., gage pressure) is 0.00 MPa. The mixing ratio of the working fluid at each point (A1 to A6) on the line A is shown in a table of FIG. 2. As illustrated in FIG. 2, the ratio of the working fluid is represented by R32(%)/R125(%)/tetrafluoropropane (%): A1: 0.0/81.0/19.0, A2: 10.0/60.0/30.0, A3: 20.0/40.0/40.0, A4: 27.3/27.3/45.4, A5: 40.0/6.0/54.0, A6: 44.0/0.0/56.0. The unit % in FIG. 1 is mass %.

A line B in FIG. 1 is a vapor/liquid equilibrium curve representing a saturated vapor line where the temperature is −45° C. and the pressure is 0.00 MPa. The mixing ratio of the working fluid at each point (B1 to B6) on the line B is shown in the table of FIG. 2. As illustrated in FIG. 2, the ratio of the working fluid is represented by R32(%)/R125(%)/tetrafluoropropane(%): B1: 0.0/92.2/7.8, B2: 15.1/72.2/12.7, B3: 30.9/51.6/17.5, 84: 42.6/37.1/20.4, B5: 64.9/9.1/26.0 and B6: 72.4/0.0/27.6. A region between both the lines A and B is a two-phase region.

FIGS. 1 and 2 shows that, in order to avoid occurrence of negative pressure in the low-pressure circuit of the refrigeration cycle apparatus when an evaporation temperature of the working fluid is −45° C., it is necessary to control the composition in a range in which the saturated vapor line where the pressure is 0.00 MPa is not higher than −45° C. That is, it is necessary to determine the mixing ratio in a composition range below the line B of FIG. 1. Accordingly, the saturated vapor line where the pressure is 0.00 MPa cannot be higher than −45° C. when the following refrigerant is employed as the working fluid for the refrigeration cycle apparatus. The refrigerant consists of a mixture of two or more non-azeotropic refrigerant mixtures in which a high-boiling refrigerant and a low-boiling refrigerant are mixed together at the composition range of below the line B of FIG. 1. When such a refrigerant is used as the working fluid in the refrigeration cycle apparatus, occurrence of negative pressure in the low-pressure circuit can be avoided, thereby assuring a highly reliable operation.

In Embodiment 1 described above, the high-boiling refrigerant is tetrafluoropropane. Especially preferred tetrafluoropropane as a refrigerant is 2,3,3,3-tetrafluoropropane (HFO-1234yf). Although the low-boiling refrigerant is R32 or R125, or R32 or R125 in Embodiment 1 described above, the invention is not limited to the same. Other low-boiling refrigerants, such as R143a (1,1,1-trifluoroethane) having a boiling point of −47° C., may also be employed. The same effects can be provided by mixing such a low-boiling refrigerant with a high-boiling refrigerant, namely, tetrafluoropropane.

Embodiment 2

Figure 3:
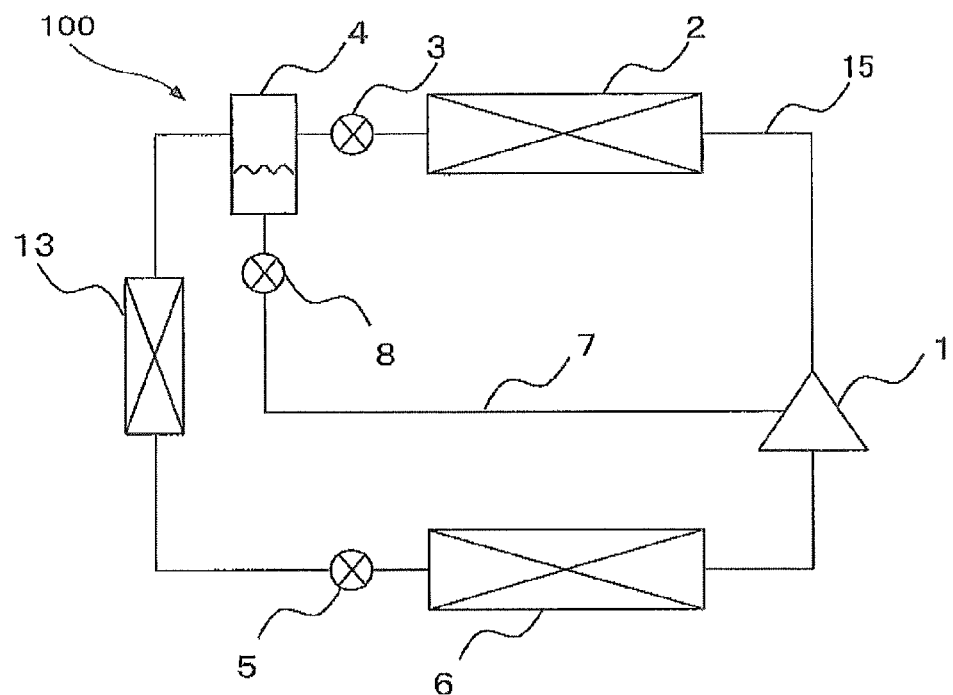
FIG. 3 schematically illustrates a configuration of a refrigerant circuit of a refrigeration cycle apparatus according to Embodiment 2.

FIG. 3 schematically illustrates a refrigerant circuit configuration of a refrigeration cycle apparatus 100 according to Embodiment 2 of the invention. With reference to FIG. 3, a configuration and an operation of the refrigeration cycle apparatus 100 will be described. The refrigeration cycle apparatus 100, operating as a cooling apparatus or a heating apparatus, incorporates a refrigeration cycle through which a non-azeotropic refrigerant mixture circulates as a working fluid. The non-azeotropic refrigerant mixture includes a high-boiling refrigerant (namely tetrafluoropropane) and a low-boiling refrigerant (e.g., R32 or R125, or R32 or R125) mixed together. Illustrations of the components in FIG. 3 and the following drawings are not always to scale.

As illustrated in FIG. 3, the refrigeration cycle apparatus 100 includes a compressor 1, a condenser 2, a first decompressor 3, a vapor/liquid separator 4, an auxiliary condenser 13, a second decompressor 5 and an evaporator 6 which are connected sequentially with a refrigerant pipe 15. The refrigeration cycle apparatus 100 further includes an intermediate-pressure injection circuit 7 for introducing a refrigerant taken out of a liquid section of the vapor/liquid separator 4 into an intermediate-pressure section of the compressor 1. In particular, the intermediate-pressure injection circuit 7 is formed by connecting the vapor/liquid separator 4 and the compressor 1. The intermediate-pressure injection circuit 7 includes a third decompressor 8.

The compressor 1 sucks the refrigerant circulating through the refrigerant pipe 15, compresses the same to provide a high-temperature and high-pressure refrigerant. The condenser 2 exchanges heat between the refrigerant circulating through the refrigerant pipe 15 and a fluid (e.g., air, water or a refrigerant) and condenses the refrigerant. The first decompressor 3 decompresses the refrigerant circulating through the refrigerant pipe 15 so that the refrigerant is expanded. The first decompressor 3 may preferably be an electronic expansion valve. The vapor/liquid separator 4 separates the flowing-in refrigerant into a vapor refrigerant and a liquid refrigerant. The auxiliary condenser 13 assists the condenser 2 in exchanging heat between the refrigerant circulating through the refrigerant pipe 15 and a fluid (e.g., air, water or a refrigerant) so as to condense the refrigerant.

The second decompressor 5 decompresses the refrigerant circulating through the refrigerant pipe 15 so that the refrigerant is expanded. Usually, a ratio of opening is controlled to maintain constant outlet superheat (i.e., quality of wet vapor) of the evaporator 6. The second decompressor 5 may preferably be an electronic expansion valve. The evaporator 6 exchanges heat between the refrigerant circulating through the refrigerant pipe 15 and a fluid so that the refrigerant is evaporated. The intermediate-pressure injection circuit 7, connecting the vapor/liquid separator 4 and the compressor 1, introduces the refrigerant taken out of a liquid section of the vapor/liquid separator 4 into the intermediate-pressure section of the compressor 1. The third decompressor 8 decompresses the refrigerant circulating through the intermediate-pressure injection circuit 7 so that the refrigerant is expanded. The third decompressor 8 may preferably be an electronic expansion valve.

An operation of the refrigeration cycle apparatus 100 will be described.

When the refrigeration cycle apparatus 100 begins its operation, the compressor 1 is first driven. The compressor 1 compresses a high-temperature and high-pressure vapor refrigerant, which is then discharged from the compressor 1 and flows into the condenser 2. In the condenser 2, the flowing-in vapor refrigerant is condensed while radiating heat into the fluid to provide a low-temperature and high-pressure refrigerant. The refrigerant then flows out of the condenser 2 and is decompressed by the first decompressor 3 to provide a vapor/liquid two-phase refrigerant. The vapor/liquid two-phase refrigerant then flows into the vapor/liquid separator 4. The liquid refrigerant stored in the vapor/liquid separator 4 is a high-boiling refrigerant-rich refrigerant which has a composition with a higher proportion of tetrafluoropropane as a high-boiling refrigerant.

The intermediate-pressure injection circuit 7 takes out only the high-boiling refrigerant-rich liquid refrigerant stored in the vapor/liquid separator 4. The high-boiling refrigerant-rich liquid refrigerant is decompressed by the third decompressor 8 so that the refrigerant is expanded. The expanded refrigerant is then introduced into the intermediate-pressure section of the compressor 1. The refrigerant at an outlet of the vapor/liquid separator 4 is a low-boiling refrigerant-rich refrigerant. The low-boiling refrigerant-rich refrigerant flows into the auxiliary condenser 13, where the refrigerant is condensed into a liquid while radiating heat into a fluid. The refrigerant, flowing out of the auxiliary condenser 13, is decompressed by the second decompressor 5.

The refrigerant decompressed by the second decompressor 5 flows into the evaporator 6. The refrigerant which flows into the evaporator 6 absorbs heat from the fluid to provide evaporating gas. The refrigerant flows out of the evaporator 6 and is again sucked by the compressor 1. In the compressor 1, the low-boiling refrigerant-rich gas refrigerant flowing out of the evaporator 6 is introduced into the intermediate-pressure injection circuit 7, where the refrigerant is again compressed together with the high-boiling refrigerant-rich liquid refrigerant decompressed by the third decompressor 8 to turn into a high-temperature and high-pressure gas refrigerant and discharged and fed to the condenser 2.

In the thus-configured refrigeration cycle apparatus 100, the refrigerant in a low-pressure circuit of the refrigeration cycle apparatus 100 has a composition with a higher proportion of low-boiling refrigerant. In the refrigeration cycle apparatus 100, pressure in the vapor/liquid separator 4 can be changed by controlling ratios of opening of the first decompressor 3 and the second decompressor 5. As the pressure in the vapor/liquid separator 4 becomes lower, the high-boiling refrigerant in the composition of the liquid refrigerant stored in the vapor/liquid separator 4 becomes higher in proportion whereas the low-boiling refrigerant in the composition of the refrigerant at the outlet of the vapor/liquid separator 4, i.e., the refrigerant in the low-pressure circuit, becomes higher in proportion.

In the refrigeration cycle apparatus 100, composition ratios of the refrigerant circulating through the intermediate-pressure injection 7 and the refrigerant circulating through the low-pressure circuit can be changed as desired by adjusting the pressure in the vapor/liquid separator 4. Thus, a composition with which a saturated vapor line of a working fluid at the pressure of 0.00 MPa in the low-pressure circuit of the refrigeration cycle apparatus 100 is not higher than −45° C. can be obtained. With such a composition, it is prevented that the low-pressure circuit from being under negative pressure, thereby assuring a highly reliable operation. The composition ratios of the refrigerants can be adjusted further accurately when the non-azeotropic refrigerant mixture according to Embodiment 1 is incorporated in the refrigeration cycle apparatus 100.

Embodiment 3

Figure 4:
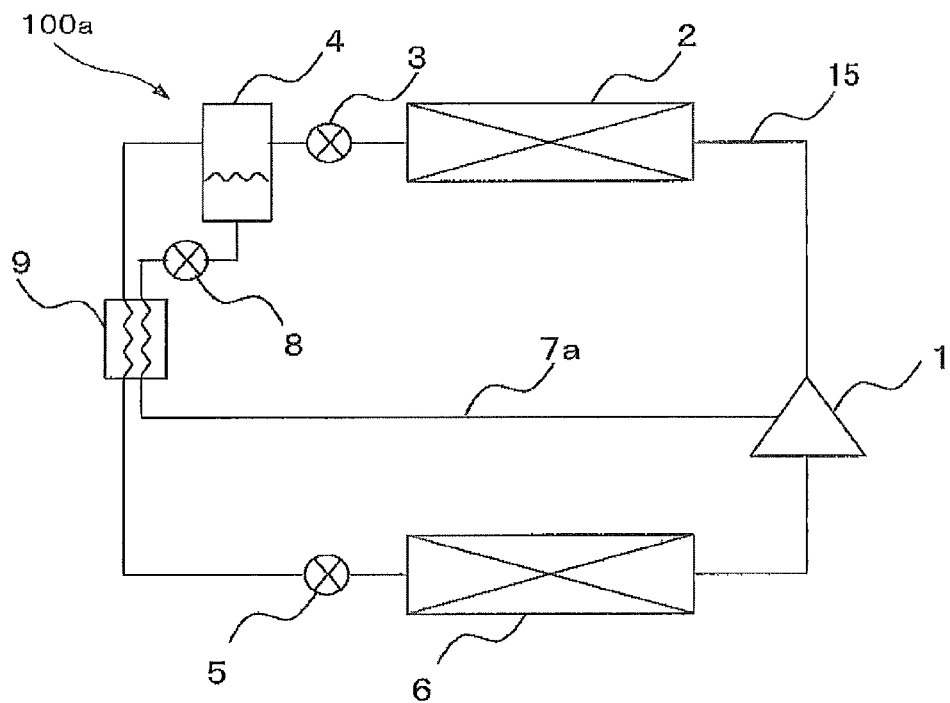
FIG. 4 schematically illustrates a configuration of a refrigerant circuit of a refrigeration cycle apparatus according to Embodiment 3.

FIG. 4 schematically illustrates a refrigerant circuit configuration of a refrigeration cycle apparatus 100a according to Embodiment 3 of the invention. With reference to FIG. 4, a configuration and an operation of the refrigeration cycle apparatus 100a will be described. The refrigeration cycle apparatus 100a performs cooling operation or heating operation using a refrigeration cycle through which a non-azeotropic refrigerant mixture circulates as a working fluid. The non-azeotropic refrigerant mixture includes a high-boiling refrigerant (namely tetrafluoropropane) and a low-boiling refrigerant (e.g., R32 or R125, or R32 or R125) mixed together. In Embodiment 3, the same components as those of Embodiment 2 are denoted by the same reference numerals. Differences from Embodiment 2 will be described mainly.

The refrigeration cycle apparatus 100a has a configuration substantially similar to that of the refrigeration cycle apparatus 100 according to Embodiment 2 except that the refrigeration cycle apparatus 100a further includes a supercooling heat exchanger 9 and that an intermediate-pressure injection circuit 7a has a configuration different from that of the intermediate-pressure injection circuit 7. The intermediate-pressure injection circuit 7a is configured in such a way that by connecting a vapor/liquid separator 4 and the compressor 1 via a third decompressor 8 and the supercooling heat exchanger 9, a refrigerant taken out of a liquid section of the vapor/liquid separator 4 is introduced into an intermediate-pressure section of the compressor 1. The supercooling heat exchanger 9 exchanges heat between the refrigerant circulating between the vapor/liquid separator 4 and a second decompressor 5 and the refrigerant circulating between the third decompressor 8 and the compressor 1. That is, the supercooling heat exchanger 9 has a function to liquefy the refrigerant flowing out of an outlet of the vapor/liquid separator 4 by the refrigerant which is decompressed and expanded by the third decompressor 8 further to supercool the same.

An operation of the refrigeration cycle apparatus 100a will be described. When the refrigeration cycle apparatus 100a begins its operation, the compressor 1 is first driven. The compressor 1 compresses a high-temperature and high-pressure vapor refrigerant, which is then discharged from the compressor 1 and flows into the condenser 2. In the condenser 2, the flowing-in vapor refrigerant is condensed while radiating heat into the fluid to provide a low-temperature and high-pressure refrigerant. The refrigerant then flows out of the condenser 2 and is decompressed by the first decompressor 3 to provide a vapor/liquid two-phase refrigerant. The vapor/liquid two-phase refrigerant then flows into the vapor/liquid separator 4. The liquid refrigerant stored in the vapor/liquid separator 4 is a high-boiling refrigerant-rich refrigerant which includes a higher proportion of tetrafluoropropane as a high-boiling refrigerant.

The intermediate-pressure injection circuit 7a takes out only the high-boiling refrigerant-rich liquid refrigerant stored in the vapor/liquid separator 4. The high-boiling refrigerant-rich liquid refrigerant is decompressed by the third decompressor 8 so that the refrigerant is expanded. The expanded refrigerant is then introduced into the supercooling heat exchanger 9. The supercooling heat exchanger 9 exchanges heat between the flowing-in refrigerant and the refrigerant flowing out of the outlet of the vapor/liquid separator 4. The refrigerant flowing out of the outlet of the vapor/liquid separator 4 is thus liquified and supercooled. The refrigerant which supercooled the refrigerant flowing out of the outlet of the vapor/liquid separator 4 flows out of the supercooling heat exchanger 9 and is then introduced into the intermediate-pressure section of the compressor 1.

The refrigerant at an outlet of the vapor/liquid separator 4 is a low-boiling refrigerant-rich refrigerant. The low-boiling refrigerant-rich refrigerant flows into the supercooling heat exchanger 9 to be supercooled. The refrigerant flows out of the supercooling heat exchanger 9 to be decompressed by the second decompressor 5. The refrigerant decompressed by the second decompressor 5 flows into the evaporator 6. The refrigerant which flows into the evaporator 6 absorbs heat from the fluid to provide evaporating gas. The refrigerant flows out of the evaporator 6 to be again sucked by the compressor 1. In the compressor 1, the low-boiling refrigerant-rich vapor refrigerant flowing out of the evaporator 6 is introduced into the intermediate-pressure injection circuit 7a, where the refrigerant is again compressed together with the high-boiling refrigerant-rich liquid refrigerant decompressed by the third decompressor 8 to turn into a high-temperature and high-pressure vapor refrigerant and discharged and fed to the condenser 2.

In the thus-configured refrigeration cycle apparatus 100a, the refrigerant in a low-pressure circuit of the refrigeration cycle apparatus 100a has a composition with a higher proportion of low-boiling refrigerant. Since the refrigeration cycle apparatus 100a includes the intermediate-pressure injection circuit 7a as an economiser circuit, a low-boiling refrigerant-rich refrigerant flowing out of the outlet of the vapor/liquid separator 4 can be reliably supercooled. At the same time, effects of the refrigeration cycle apparatus 100 according to Embodiment 2 can also be achieved with the refrigeration cycle apparatus 100a. That is, ability degradation by the low-boiling refrigerant-rich refrigerant is avoided while refrigerating capacity is increased. In the refrigeration cycle apparatus 100a, the intermediate-pressure injection circuit 7a reduces the circulating volume of the refrigerant. Thus, pressure loss in the refrigerant circulation is reduced and operating efficiency of the refrigeration cycle apparatus 100a is improved. The composition ratios of the refrigerants can be adjusted further accurately when the non-azeotropic refrigerant mixture according to Embodiment 1 is incorporated in the refrigeration cycle apparatus 100a.

Embodiment 4

Figure 5:
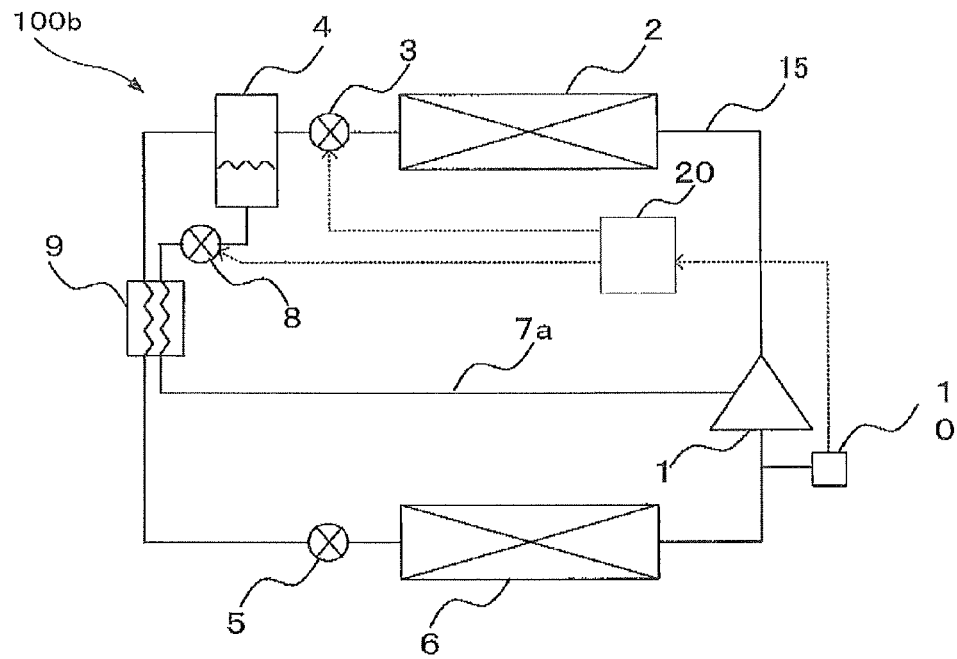
FIG. 5 schematically illustrates a configuration of a refrigerant circuit of a refrigeration cycle apparatus according to Embodiment 4.

FIG. 5 schematically illustrates a refrigerant circuit configuration of a refrigeration cycle apparatus 100b according to Embodiment 4 of the invention. With reference to FIG. 5, a configuration and an operation of the refrigeration cycle apparatus 100b will be described. The refrigeration cycle apparatus 100b, operating as a cooling apparatus or a heating apparatus, incorporates a refrigeration cycle through which a non-azeotropic refrigerant mixture circulates as a working fluid. The non-azeotropic refrigerant mixture includes a high-boiling refrigerant (namely tetrafluoropropane) and a low-boiling refrigerant (e.g., R32 or R125, or R32 or R125) mixed together. In Embodiment 4, the same components as those of the second and Embodiment 3s are denoted by the same reference numerals. Components differing from those of the second and Embodiment 3s will be described mainly.

The refrigeration cycle apparatus 100b has a configuration substantially similar to that of the refrigeration cycle apparatus 100a according to Embodiment 3 except that the refrigeration cycle apparatus 100b further includes a pressure detector 10 in a low-pressure circuit. As illustrated in FIG. 5, the pressure detector 10 is disposed in the low-pressure circuit (i.e., at a refrigeration sucking side of the compressor 1). The pressure detector 10 may, for example, be a pressure sensor for detecting low pressure of the refrigerant sucked into the compressor 1. Pressure information detected by the pressure detector 10 is fed to a controller 20, which adjusts ratios of opening of a first decompressor 3 and a second decompressor 5. In addition, the refrigerant pressure sucked by the compressor 1 may be detected by assuming from the environmental temperature, operation states, and temperature information of a temperature detector, which are known-art.

An operation of the refrigeration cycle apparatus 100b will be described.

Since the refrigeration cycle apparatus 100b operates in substantially the same manner as in the refrigeration cycle apparatus 100a according to Embodiment 3, operations regarding the pressure detector 10 will be described mainly. The pressure detector 10 detects the pressure in a low-boiling refrigerant-rich refrigerant being sucked into the compressor 1. The controller 20 determines, on the basis of information from the pressure detector 10, whether or not the low-pressure circuit is under negative pressure. The controller 20 controls ratios of opening of the first decompressor 3 and the second decompressor 5 so that the low-pressure circuit is not made to be under negative pressure. Thus, the pressure in the vapor/liquid separator 4 can be controlled.

That is, the controller 20 reduces the pressure in the vapor/liquid separator 4 on the basis of the pressure information from the pressure detector 10 so that the low-pressure circuit is not made to be a negative pressure. When the pressure in the vapor/liquid separator 4 is decreased, a tetrafluoropropane component as a high-boiling refrigerant circulating through the intermediate-pressure injection circuit 7a can be increased and R32 and R125 components as low-boiling refrigerants at an outlet of the vapor/liquid separator 4 can be increased. The controller 20 prevents occurrence of a negative pressure in the low-pressure circuit and maintains a positive pressure.

Figure 6:
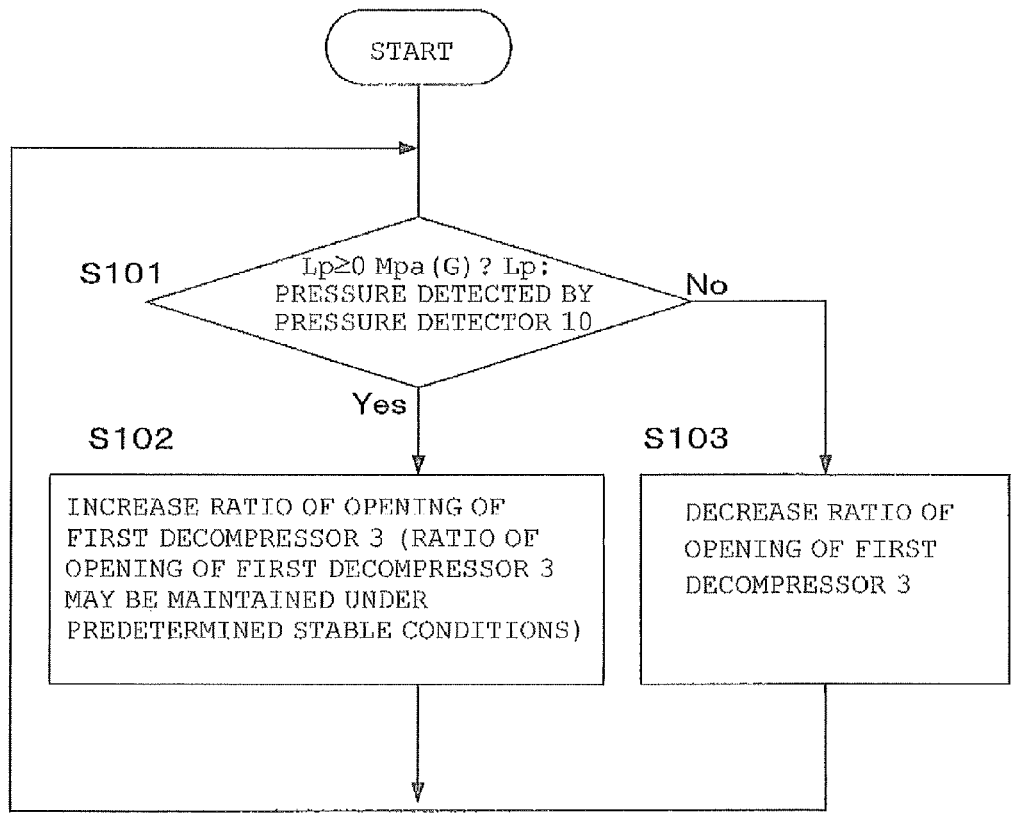
FIG. 6 is a flowchart which illustrates a flow of a process for adjusting a ratio of opening of a first decompressor on the basis of pressure information from a pressure detector.

FIG. 6 is a flowchart illustrating a flow of a process for adjusting a ratio of opening of the first decompressor 3 on the basis of the pressure information from the pressure detector 10. With reference to FIG. 6, a concrete flow of a process for adjusting the ratio of opening of the first decompressor 3 which is characteristic of the refrigeration cycle apparatus 100b according to Embodiment 4 will be described. As described above, the controller 20 determines whether or not the low-pressure circuit becomes a negative pressure on the basis of information from the pressure detector 10 and adjusts the ratio of opening of the first decompressor 3 on the basis of the determination result.

In particular, the controller 20 determines whether or not the low-pressure circuit is under negative pressure by determining whether or not the pressure (Lp) detected by the pressure detector 10 is not lower than 0 Mpa(G) (step S101). When Lp is not lower than 0 Mpa(G), the controller 20 determines that the low-pressure circuit is not under negative pressure (affirmative in step S101) and increases the ratio of opening of the first decompressor 3 (step S102). The ratio of opening of the first decompressor 3 may be maintained under predetermined stable conditions. When Lp is lower than 00 Mpa(G), the controller 20 determines that the low-pressure circuit is under negative pressure (negative in step S101) and decreases the ratio of opening of the first decompressor 3 (step S103). Such control operations are repeated to prevent the low-pressure circuit from being under negative pressure.

In the thus-configured refrigeration cycle apparatus 100b, the refrigerant in a low-pressure circuit of the refrigeration cycle apparatus 100b has a composition with a higher proportion of low-boiling refrigerant. Since the refrigeration cycle apparatus 100b includes the pressure detector 10, occurrence of negative pressure in the low-pressure circuit can be avoided in a range in which the composition can be adjusted in the event that the composition of the circulating refrigerant varies due to leakage of the refrigerant during operation of the refrigeration cycle or malfunctions at the time of filling the refrigeration cycle with the refrigerant. At the same time, effects of the refrigeration cycle apparatus 100 according to Embodiment 1 and the refrigeration cycle apparatus 100a according to Embodiment 2 can also be achieved with the refrigeration cycle apparatus 100b. Accordingly, in the event that the composition becomes out of control, such malfunctions can be detected rapidly and alerted auditorily or visually. With this configuration, the refrigeration cycle apparatus 100b of increased safety and reliability can be obtained.

The refrigeration cycle apparatus 100b according to Embodiment 4 is configured by providing the pressure detector 10 and the controller 20 in the refrigeration cycle apparatus 100a according to Embodiment 3, however, an alternative configuration of providing the pressure detector 10 and the controller 20 in the refrigeration cycle apparatus 100 according to Embodiment 2 is allowable. Although the pressure detector 10 and the controller 20 are provided separately in Embodiment 4, these components may alternatively be integrated together. The composition ratios of the refrigerants can be adjusted further accurately when the non-azeotropic refrigerant mixture according to Embodiment 1 is incorporated in the refrigeration cycle apparatus 100b.

Embodiment 5

Figure 7:
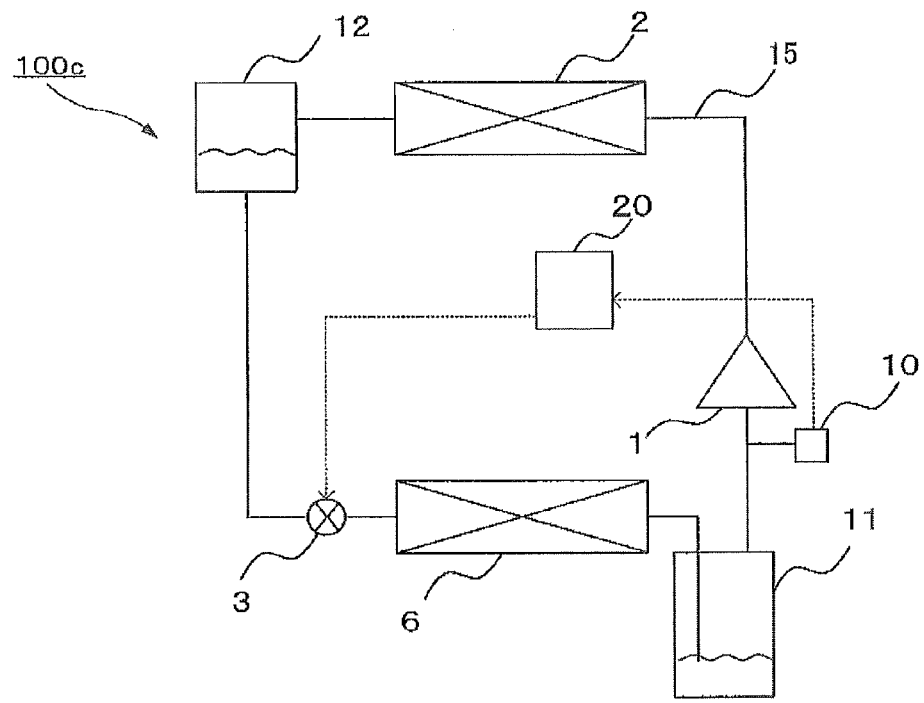
FIG. 7 schematically illustrates a configuration of a refrigerant circuit of a refrigeration cycle apparatus according to Embodiment 5.

FIG. 7 schematically illustrates a refrigerant circuit configuration of a refrigeration cycle apparatus 100c according to Embodiment 5 of the invention. With reference to FIG. 7, a configuration and an operation of the refrigeration cycle apparatus 100c will be described. The refrigeration cycle apparatus 100c, operating as a cooling apparatus or a heating apparatus, incorporates a refrigeration cycle through which a non-azeotropic refrigerant mixture circulates as a working fluid. The non-azeotropic refrigerant mixture includes a high-boiling refrigerant (namely tetrafluoropropane) and a low-boiling refrigerant (e.g., R32 or R125, or R32 or R125) mixed together. In Embodiment 5, the same components as those of the second to Embodiment 4s are denoted by the same reference numerals. Components differing from those of the second to Embodiment 4s will be described mainly.

As illustrated in FIG. 7, the refrigeration cycle apparatus 100c includes a compressor 1, a condenser 2, a liquid receiver 12, a first decompressor 3 (decompressor), an evaporator 6 and a low-pressure vapor/liquid separator 11 which are connected sequentially with a refrigerant pipe 15. The refrigeration cycle apparatus 100c further includes a pressure detector 10 provided in a low-pressure circuit in the same manner as the refrigeration cycle apparatus 100b according to Embodiment 4. The liquid receiver 12 stores a refrigerant circulating through the refrigeration cycle. The low-pressure vapor/liquid separator 11 separates the flowing-in refrigerant into a gas refrigerant and a liquid refrigerant and stores a liquid refrigerant.

An operation of the refrigeration cycle apparatus 100c will be described. When the refrigeration cycle apparatus 100c begins its operation, the compressor 1 is first driven. The compressor 1 compresses a high-temperature and high-pressure vapor refrigerant, which is then discharged from the compressor 1 and flows into the condenser 2. In the condenser 2, the flowing-in vapor refrigerant, is condensed while radiating heat into the fluid to provide a low-temperature and high-pressure refrigerant. The refrigerant flows out of the condenser 2, flows into the liquid receiver 12 and stored therein. The liquid refrigerant taken out of the liquid receiver 12 is decompressed by the first decompressor 3 to provide a low-pressure vapor/liquid two-phase refrigerant. The vapor/liquid two-phase refrigerant then flows into the evaporator 6.

The refrigerant which flows into the evaporator 6 absorbs heat from the fluid to provide evaporating gas. The refrigerant flowing out of the evaporator 6 (i.e., the refrigerant including a liquid refrigerant which remains unevaporated in the evaporator 6) flows in the low-pressure vapor/liquid separator 11. The refrigerant flowing in the low-pressure vapor/liquid separator 11 is separated into a vapor refrigerant and a liquid refrigerant. Only the vapor refrigerant is again sucked in the compressor 1. The compressor 1 compresses the vapor refrigerant separated by the low-pressure vapor/liquid separator 11. The obtained high-temperature and high-pressure vapor refrigerant is discharged and fed to the condenser 2.

The refrigerant which remains unevaporated in the evaporator 6 and flows in the low-pressure vapor/liquid separator 11 as the liquid refrigerant is stored in a lower portion of the low-pressure vapor/liquid separator 11 as the liquid refrigerant. The liquid refrigerant stored in the lower portion of the low-pressure vapor/liquid separator 11 is a high-boiling refrigerant-rich refrigerant which includes a higher proportion of tetrafluoropropane as a high-boiling refrigerant. The vapor refrigerant taken out of the low-pressure vapor/liquid separator 11 is a low-boiling refrigerant-rich refrigerant which includes a lower proportion of tetrafluoropropane as a high-boiling refrigerant. With this configuration, the refrigerant circulating through the refrigeration cycle apparatus 100c can be a low-boiling refrigerant-rich refrigerant.

As the ratio of opening of the first decompressor 3 is increased, the refrigerant flowing into the low-pressure vapor/liquid separator 11 as a liquid refrigerant which remains unevaporated in the evaporator 6 increases in amount. Thus, the high-boiling refrigerant-rich refrigerant stored in a lower portion of the low-pressure vapor/liquid separator 11 increases in amount. Accordingly, the low-boiling refrigerant-rich refrigerant increases in amount as the refrigerant circulating through the refrigeration cycle apparatus 100c. Since the refrigeration cycle apparatus 100c includes the pressure detector 10 provided in the low-pressure circuit, the ratio of opening of the first decompressor 3 can be controlled so that the low-pressure circuit is not made to be under negative pressure and the refrigerant circulating through the refrigeration cycle apparatus 100c can be controlled to have a composition ratio of a low-boiling refrigerant-rich refrigerant.

Figure 8:
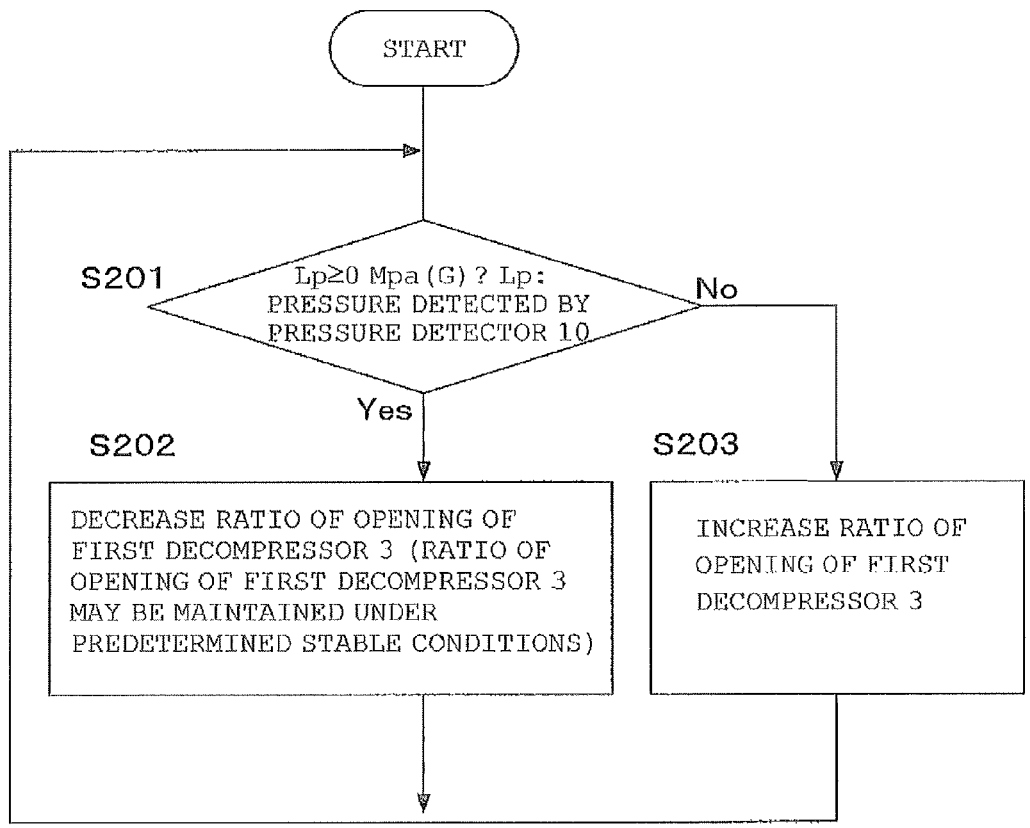
FIG. 8 is a flowchart which illustrates a flow of a process for adjusting a ratio of opening of a first decompressor on the basis of pressure information from a pressure detector.

FIG. 8 is a flowchart illustrating a flow of a process for adjusting a ratio of opening of the first decompressor 3 on the basis of the pressure information from the pressure detector 10. With reference to FIG. 8, a flow of a process for adjusting the ratio of opening of the first decompressor 3 which is characteristic to the refrigeration cycle apparatus 100c according to Embodiment 5 will be described. As described above, the controller 20 determines whether or not the low-pressure circuit is under negative pressure on the basis of information from the pressure detector 10 and adjusts the ratio of opening of the first decompressor 3 on the basis of the determination result.

In particular, the controller 20 determines whether or not the low-pressure circuit is under negative pressure by determining whether or not the pressure (Lp) detected by the pressure detector 10 is not lower than 0 Mpa(G) (step S201). When Lp is not lower than 0 Mpa(G), the controller 20 determines that the low-pressure circuit is not under negative pressure (affirmative in step S201) and decreases the ratio of opening of the first decompressor 3 (step S202). The ratio of opening of the first decompressor 3 may be maintained under predetermined stable conditions. When Lp is lower than 00 Mpa(G), the controller 20 determines that the low-pressure circuit is under negative pressure (negative in step S201) and increases the ratio of opening of the first decompressor 3 (step S203). Such control operations are repeated to prevent the low-pressure circuit from being under negative pressure.

By configuring the refrigeration cycle apparatus 1000 like the above, the refrigerant in a low-pressure circuit of the refrigeration cycle apparatus 100c can have a composition with a higher proportion of low-boiling refrigerant. In the refrigeration cycle apparatus 100c, a low-boiling refrigerant-rich refrigerant in the low-pressure circuit is obtained by controlling the ratio of opening of the first decompressor 3 so that the high-boiling refrigerant stored in the low-pressure vapor/liquid separator 11 is increased. The refrigeration cycle apparatus 100c does not have to have a complicated refrigeration cycle configuration. In addition to the effect of the refrigeration cycle apparatus 100 according to Embodiment 1.

Since the refrigeration cycle apparatus 100c includes the pressure detector 10, occurrence of negative pressure in the low-pressure circuit can be avoided in a range in which the composition can be adjusted in the event that the composition of the circulating refrigerant varies due to leakage of the refrigerant during operation of the refrigeration cycle or malfunctions at the time of filling the refrigeration cycle with the refrigerant. At the same time, effects of the refrigeration cycle apparatus 100 according to Embodiment 1 and the refrigeration cycle apparatus 100a according to Embodiment 2 can also be achieved with the refrigeration cycle apparatus 100c. Accordingly, in the event that the composition becomes out of control, such malfunctions can be detected rapidly and alerted auditorily or visually. With this configuration, the refrigeration cycle apparatus 100c of increased safety and reliability can be obtained. The composition ratios of the refrigerants can be adjusted further accurately when the non-azeotropic refrigerant mixture according to Embodiment 1 is incorporated in the refrigeration cycle apparatus 100c.

The refrigeration cycle apparatuses 100 to 100c according to Embodiments described above can be applied to, for example, an air conditioner, a refrigerator, a room air conditioner, a packaged air-conditioner, a cold storage, a humidifier, a humidity controller and a heat pump water heater. The refrigeration cycle apparatuses 100 to 100c exhibit high performance especially in low-temperature uses or in heating operations in low-temperature environments. The controller 20 may preferably be a microcomputer which collectively controls the entire refrigeration cycle apparatuses 100 to 100c.

REFERENCE SIGNS LIST

1: compressor
2: condenser
3: first decompressor
4: gas/liquid separator
5: second decompressor
6: evaporator
7: intermediate-pressure injection circuit
7a: intermediate-pressure injection circuit
8: third decompressor
9: supercooling heat exchanger
10: pressure detector
11: low-pressure gas/liquid separator
12: liquid receiver
13: auxiliary condenser
15: refrigerant pipe
20: controller
100: refrigerating cycle device
100a: refrigerating cycle device
100b: refrigerating cycle device
100c: refrigerating cycle device

The invention claimed is:

1. A non-azeotropic refrigerant mixture which circulates through a refrigeration cycle configured at least by a compressor, a condenser, a decompressor and an evaporator, the non-azeotropic refrigerant mixture consisting of tetrafluoropropane as a high-boiling refrigerant and a or some low-boiling refrigerant(s) mixed together at a predetermined mixing ratio, wherein the mixing ratio of said high-boiling refrigerant and said low-boiling refrigerant is determined so that a saturated vapor line where a gauge pressure that suppresses refrigerant decomposition due to incorporation of the fluid is 0.00 MPa is not higher than −45° C. in a low-pressure circuit formed between said decompressor and said compressor.

2. A refrigeration cycle apparatus in which a non-azeotropic refrigerant mixture circulates through a refrigeration cycle configured by a compressor, a condenser, a first decompressor, a vapor/liquid separator, a second decompressor and an evaporator which are connected sequentially, the non-azeotropic refrigerant mixture consisting of a high-boiling refrigerant and a or some low-boiling refrigerant(s) mixed at a predetermined mixing ratio, the apparatus comprising a controller for variably adjusting a pressure in said vapor/liquid separator by controlling opening of said first decompressor and said second decompressor, and determining the mixing ratio of said high-boiling refrigerant and said low-boiling refrigerant of said non-azeotropic refrigerant mixture so that a saturated vapor line where a gauge pressure that suppresses refrigerant decomposition due to incorporation of the fluid is 0.00 MPa is not to be higher than −45° C. in a low-pressure circuit formed between said second decompressor and said compressor.

3. The refrigeration cycle apparatus of claim 2, further comprising an intermediate-pressure injection circuit which introduces a refrigerant taken out of a liquid section of said vapor/liquid separator into an intermediate-pressure section of said compressor via a third decompressor, wherein said controller adjusts, according to the pressure in said vapor/liquid separator, a composition ratio of a non-azeotropic refrigerant mixture circulating through said intermediate-pressure injection circuit and a composition ratio of a non-azeotropic refrigerant mixture circulating through said low-pressure circuit.

4. The refrigeration cycle apparatus of claim 3, wherein said controller adjusts pressure in said vapor/liquid separator so that a non-azeotropic refrigerant mixture circulating through said intermediate-pressure injection circuit has a composition with a higher proportion of a high-boiling refrigerant and that a non-azeotropic refrigerant mixture circulating through said low-pressure circuit has a composition with a higher proportion of a low-boiling refrigerant.

5. The refrigeration cycle apparatus of claim 3, further comprising a supercooling heat exchanger which exchanges heat between a refrigerant taken out of a liquid section of said vapor/liquid separator and a refrigerant circulating between said vapor/liquid separator and said second decompressor.

6. The refrigeration cycle apparatus of claim 3 wherein said controller adjusts a composition ratio of a non-azeotropic refrigerant mixture circulating through said intermediate-pressure injection circuit and a composition ratio of a non-azeotropic refrigerant mixture circulating through said low-pressure circuit on the basis of the pressure of the refrigerant sucked by said compressor.

7. The refrigeration cycle apparatus of claim 2, wherein said high-boiling refrigerant is tetrafluoropropane.

8. A refrigeration cycle apparatus in which a non-azeotropic refrigerant mixture circulates through a refrigeration cycle configured by a compressor, a condenser, a liquid receiver, a decompressor, an evaporator and a low-pressure vapor/liquid separator which are connected sequentially, the non-azeotropic refrigerant mixture consisting of a high-boiling refrigerant and a or some low-boiling refrigerant(s) mixed together at a predetermined mixing ratio, the apparatus comprising a controller for adjusting a composition ratio of the non-azeotropic refrigerant mixture stored in the low-pressure vapor/liquid separator and the composition ratio of the non-azeotropic refrigerant mixture made to flow out of the low-pressure vapor/liquid separator by controlling opening of the decompressor, and determining the mixing ratio of the high-boiling refrigerant and the low-boiling refrigerant of the non-azeotropic refrigerant mixture so that a saturated vapor line of the non-azeotropic refrigerant mixture where a gauge pressure that suppresses refrigerant decomposition due to incorporation of the fluid is 0.00 MPa is not to be higher than $-45°$ C. in a low-pressure circuit formed between the decompressor and the compressor.

9. The refrigeration cycle apparatus of claim 8, wherein said controller adjusts a ratio of opening of said decompressor so that a non-azeotropic refrigerant mixture stored in said low-pressure vapor/liquid separator has a composition with a higher proportion of a high-boiling refrigerant and that a non-azeotropic refrigerant mixture flowing out of said low-pressure vapor/liquid separator has a composition with a higher proportion of a low-boiling refrigerant.

10. The refrigeration cycle apparatus of claim 8, wherein said controller controls a ratio of opening of said decompressor on the basis of the pressure of the refrigerant sucked by said compressor and adjusts a composition ratio of a non-azeotropic refrigerant mixture stored in said low-pressure vapor/liquid separator and a composition ratio of a non-azeotropic refrigerant mixture flowing out of said low-pressure vapor/liquid separator.

11. The refrigeration cycle apparatus of claim 8, wherein said high-boiling refrigerant is tetrafluoropropane.

* * * * *